United States Patent [19]

Chin et al.

[11] Patent Number: 5,384,158
[45] Date of Patent: Jan. 24, 1995

[54] METHOD FOR PREPARING A MAGNETIC RECORDING MEDIUM

[75] Inventors: Tsung-Shune Chin; Wei-Der Chang; Ming-Cheng Deng, all of Hsinchu, Taiwan, Prov. of China

[73] Assignee: National Science Council, Taipei, Taiwan, Prov. of China

[21] Appl. No.: 217,370

[22] Filed: Mar. 24, 1994

Related U.S. Application Data

[63] Continuation of Ser. No. 57,648, May 4, 1993, abandoned.

[51] Int. Cl.$^6$ .............................................. H01F 10/02
[52] U.S. Cl. ..................... 427/129; 427/128; 427/130; 427/131; 427/226; 427/374.2; 427/380; 427/398.2
[58] Field of Search .......................... 427/128-131, 427/380, 398.2, 374.2, 427, 226

[56] References Cited

U.S. PATENT DOCUMENTS

| | | | |
|---|---|---|---|
| 4,880,694 | 11/1989 | Takayama et al. | 427/132 X |
| 4,959,243 | 9/1990 | Steininger | 427/132 X |
| 5,055,322 | 10/1991 | Yamamoto | 427/132 X |
| 5,215,782 | 6/1993 | Yoshioka et al. | 427/132 |

OTHER PUBLICATIONS

Os–doped Y–Fe$_2$O$_3$ thin films having coercivity and high coercive squareness; O. Ishii et al; J. Appln. Phys. 55 (6) 15 Mar. 1984 pp. 2269–2271.

Formation of Ferrite Thin Films by Vacuum Evaporation with Annealing Process.
M. Satou et al; IEEE Transactions on Magnetics vol. MAG-13, No. 5, Sep. 1977, pp. 1400–1402.
Magnetic Recording Characteristics of Sputtered Y–Fe$_2$O$_3$ Thin Film Disks; S. Hattori et al.
IEEE Transactions on Magnetics, vol. MAG-15, 6 Nov. 1979, pp. 1549–1551.
New preparation process for sputtered Y–Fe$_2$O$_3$ thin film disks Ishii et al; IEEE Transactions on Magentics, vol. MAG-16, No. 5, Sep.; pp. 1114–1116.
Preparation of thin films in the system Y Fe$_2$O$_3$–Fe$_2$3 for recording media by spray pyrolysis of organometallic solutions using an ultrasonic pump; Michel Langlet et al; IEEE Transactions on Magnetics vol. MAG-22, No. 3, May 1986, pp. 151–156.
Roadmap for 10 Gbit/in$^2$ Media: Challenges; Edward S. Murdock et al. IEEE Transactions on Magnetics, Vo. 28, No. 5, Sep. 1992, pp. 3078–3083.

*Primary Examiner*—Bernard Pianalto
*Attorney, Agent, or Firm*—Christie, Parker & Hale

[57] ABSTRACT

A method for preparing a magnetic recording medium includes the following steps of providing a substrate; providing a solution consisting essentially of ions of cobalt, manganese and iron in deionized water; and preheating the substrate and spraying the solution onto the preheated substrate at an elevated temperature to uniformly distribute droplets thereon and form a magnetic recording medium film on the substrate. Such method can prepare a magnetic thin film which has a high recording density and is cost-effective.

28 Claims, 3 Drawing Sheets

METHOD FOR PREPARING A MAGNETIC RECORDING MEDIUM

The present invention is a continuation application of the parent application bearing a Ser. No. 08/057,648 and filed on May 4, 1993, abandoned.

FIELD OF THE INVENTION

The preparing method is suitable for continuous/mass production, and has a cost lower than that of the conventional methods. The magnetic thin film prepared by the method of the present invention may have a coercivity higher than 1000 Oe to meet with the requirements for high recording density. Using the present method, an excellent magnetic thin film can be produced with a lower cost.

BACKGROUND OF THE INVENTION

At present, a hard disk is generally a thin film disk utilizing the longitudinal recording technology. The magnetization direction of the magnetic recording medium is in a longitudinal arrangement. The data read/write is achieved by use of a magnetic head or heads which slide(s) on the surface of the thin film, and utilizes a coil for dealing with a magnetic moment induction, or for generating a magnetic field by connecting to a current source in order to alter the magnetization direction of the magnetic moment. The hard disk arranged in such a manner is used in the so-called Winchester disk drive, and plays an important role on the commercial hard disk market. With greatly and rapidly progressing in technologies, new thin film disk technologies are proposed one after another. For example, the perpendicular recording and magneto-optic recording technologies which both have the advantage of large recording capacity attract many attentions in this field, and threaten the market of the longitudinal recording technology of the conventional hard disk. In addition, the trends of being more light, thinner, shorter, and smaller in technical products also push the makers to increase the recording capacity of the conventional hard disks.

In order to act as a longitudinal magnetic recording thin film having a high recording density, the following requirements should be meeted with: 1. The magnetic recording material must have a high coercivity (Hc) at least higher than 1000 Oe; 2. The residual magnetization thereof (Mr) has to be sufficiently high; 3. The thickness of the magnetic thin film has to be decreased in order to lower the demagnetization interaction among the magnetic areas of the thin film; and 4. The thin film must have a high signal to noise ratio (SNR). The ferrite magnetic thin film has a better SNR than the metal magnetic thin film has, and its coercivity can be higher than 1000 Oe by adding cobalt (Co) and manganese (Mn), and by using appropriate heat treatment conditions. Therefore, the ferrite magnetic thin film is known as an excellent material for the longitudinal magnetic thin film having a high recording density.

The paper: E. T. Wuori and D. E. Speliotis, "Plating in the Electronic Industry", 3rd symposium, (1971), 315, disclosed an iron thin film formed by an evaporation method. The evaporated iron thin film is converted into an $\alpha$-$Fe_2O_3$ film by an oxidation treatment at temperature about 450°–500° C., and is then reduced to an $Fe_3O_4$ film in an $H_2$ and CO atmosphere. Another paper: R. L. Comstock and E. B. Moore, IBM J. Res. Dev. 18, (1974), 55, disclosed that an aqueous solution of $Fe(NO_3)_3$ $9H_2O$ is sprayed to a preheated substrate at 300°–350° C. by a rotation deposition method to obtain an $\alpha$-$Fe_2O_3$ thin film, and then the $Fe_3O_4$ and $\gamma$-$Fe_2O_3$ thin films can be formed respectively by reduction and oxidation heat-treatments.

Prior researchers all concentrated on the phase synthesis, and did not dope any additives. Consequently, the resultant coercivity cannot be high, and can only reach about 200 Oe. Since 1977, some researchers proposed to utilize the technology of doping cobalt in the $\gamma$-$Fe_2O_3$ magnetic particulates to increase the coercivity of the formed thin film. The paper: M. Satuo et al., IEEE Trans. Magn., MAC-13, (1977), 1400, proposed an evaporation method for preparing a $Co_x Fe_{3-x} O_4$ thin film. In this method, iron is first evaporated on a glass substrate and converted into $\alpha$-$Fe_2O_3$ phase by oxidation at 400° C. Then, cobalt is evaporated thereon, and diffused into the $\alpha$-$Fe_2O_3$ film to form the $Co_xFe_{3-x}O_4$ thin film by an annealing process in a vacuum. The coercivity of the resulting thin film is enhanced up to 700 Oe.

The enhancement of coercivity is so large that many researchers join in this field. The paper: S. Hattori et al., IEEE Trans. Magn., MAG-15, (1979), 1549, first proposed a reactive sputtering method which is able to successfully prepare an iron-oxide magnetic thin film with additives of Co and Ti. $\alpha$-$Fe_2O_3$ is first deposited in an Ar-$O_2$ atmosphere, reduced to $Fe_3O_4$ in an $H_2$ atmosphere, and then oxidized to $\gamma$-$Fe_2O_3$. The coercivity of the obtained thin film is about 700 Oe, the squareness ratio is about 0.8, and the recording density is about 1100 bits/mm. This preparing method is the most popular process for manufacturing the iron-oxide series hard disk in industry.

Next year, the paper: S. Hattori et al., IEEE Trans. Magn., MAG-15, (1980), 1114, disclosed that the same researcher group as above further improvedly omitted one step of the preparing process. $Fe_3O_4$ is synthesized directly by a reactive sputtering method, and then is oxidized to obtain the $\gamma$-$Fe_2O_3$. Its squareness ratio is increased to about 0.85, but its coercivity is slightly decreased to about 600 Oe. Therefore, the subsequent researchers seldom adopt this process while preferring to the above method (disclosed in 1979).

In 1984, O. Ishii and I. Hatakeyama in the above researcher group proposed, as disclosed in the paper: J. Appl. Phys. 55, (1984), 2269, a reactive sputtering method to dope osmium (Os) into a ferrite magnetic thin film, and obtained a great break-through. They found that the doped Os can impart to the thin film several advantages of: 1. largely increasing the coercivity to about 1920 Oe which cannot be reached by only doping the modifier Co; 2. being capable of efficiently suppressing the grain growth during later heat treatments so as to increase the SNR of the thin film, like in the case of doping Cu; 3. enhancing the coercivity up to about 2100 Oe after the annealing in a magnetic field (7 kOe); and 4. increasing the coercive squareness S* up to about 0.95, which is more efficient than that achieved by adding Ti. However, the worst drawback of this method is that the osmium is too expensive. Therefore, a strong desire to further improve the ferrite magnetic thin film still exists in this field.

Most of the above-mentioned papers typically utilize the vacuum deposition manner to prepare the ferrite magnetic thin film. However, their necessary equipments are very expensive. Another spray pyrolysis method is also practicable, and requires only simple and economical equipments. The paper: M. Langlet et al., IEEE Trans, Magn., MAG-22, (1986), 151, disclosed such a spray pyrolysis method which is able to prepare a ferrite magnetic thin film having a high coercivity. An iron acetylacetonate is dissolved in a butanol, and an ultra-sonic vibrator utilized to aerosolize the solution. A mixed gas of Ar-$O_2$ is used to blow the aerosol droplets to the surface of a glass substrate at about 420°-550° C. to form a $\gamma$-$Fe_2O_3$-$Fe_3O_4$ thin film. The resultant film after adequate heat treatments has a maximum coercivity of about 800 Oe, and an Ms of about 400 emu/$cm^3$. If 10 wt% Co is doped therein the coercivity of the film can be increased to more than about 1000 Oe, and the Ms is about 350 emu/$cm^3$.

From the above descriptions, it is noted that the conventional methods have several drawbacks: 1. The equipments needed by the vacuum deposition method are very expensive. 2. It is difficult for the vacuum deposition method to achieve a mass or continuous production. 3. If an expensive metal, such as Os, is doped to enhance the film coercivity, the film cost will be too high.

SUMMARY OF THE INVENTION

The primary object of the present invention is to provide a method for preparing a magnetic recording medium which is able to solve the above problems. The method of the present invention primarily uses cobalt (Co) and manganese (Mn) dopants or additives to control the coercivity, and is suitable to be used to prepare a magnetic thin film having a high recording density.

Another object of the present invention is to provide a method for preparing a magnetic recording medium which is cost-effective, and can allow a mass production.

In accordance with the present invention, a method for preparing a magnetic recording medium includes the following steps of: providing a substrate; providing a solution consisting essentially of ions of cobalt, manganese and iron in deionized water, and preheating the substrate and spraying the solution onto the preheated substrate at an elevated temperature to uniformly distribute droplets thereon and form a magnetic recording medium film on the substrate. In accordance with one aspect of the present invention, the substrate must have a high-temperature stability, and may be of, for example, an alumina, alumino-magnesium alloy, stainless steel, glass, or the like. The solution includes a cobaltous nitrate, manganese nitrate, and ferric nitrate all having a purity of 99.5%. The magnetic recording medium thin film of the present invention is formed by a spray pyrolysis method. The composition of the magnetic recording medium thin film represented by wt% of cations includes 2-18% cobalt, 0-18% manganese, and 64-98% iron, and preferably 6-15% cobalt and 6-15% manganese. The formed magnetic recording medium thin film must have a $\gamma$-$Fe_2O_3$ and/or $Fe_3O_4$ phases. The thin film has a thickness of 1000-5000 nm, a coercivity of 600-1700 Oe, a saturation magnetization of 380-480 emu/$cm^3$, and a squareness ratio of 0.46-0.66 In the above-mentioned preferable case, the coercivity is higher than 1000 Oe, the saturation magnetization is higher than 420 emu/$cm^3$, and the squareness ratio is higher than 0.6.

In order to obtain the stability and above properties, the formed thin film has to be loaded into a furnace, and undergoes a first heat treatment step of being isothermally oxidized to form the $\alpha$-$Fe_2O_3$ phase in air at 400°-600° C. for 1-4 hours, and a second heat treatment step of being isothermally reduced to form the $Fe_3O_4$ phase from the $\alpha$-$Fe_2O_3$ phase in ($H_2$+$N_2$+$H_2O$) atmosphere at 300°-350° C. for 0.5-3 hours, preferably at 320°-330° C. for 1 hour The obtained thin film may undergo a third heat treatment step of raising to 400°-500° C. for 0.5-2 hours in an $N_2$ protection, isothermally, for stress relieving. The thin film may then undergo a fourth heat treatment step of lowering the furnace temperature to 300°-380° C. for isothermal oxidation in air for 0.1-4 hours, preferably in air at 360°-380° C. for 0.5-2 hours, to obtain the $\gamma$-$Fe_2O_3$ phase to be then cooled In order to obtain better results, the magnetic recording medium thin film may further undergo a fifth heat treatment step of raising the furnace temperature to 300°-380° C., and then being annealed for 0.1-10 hours in the furnace, preferably raising the temperature to 340°-380° C. and then being annealed for 2-8 hours in the furnace, to be subsequently cooled. The thin film may finally undergo a sixth heat treatment step of being isothermally reduced to form the $Fe_3O_4$ phase from the $\gamma$-$Fe_2O_3$ phase in ($H_2$+$N_2$+$H_2O$) atmosphere at 300°-350° C. for 0.5-3 hours, preferably at 320°-330° C. for 1 hour, and being moved out of the furnace after the furnace becomes cool. The magnetic recording medium thin film resulted after the six heat treatment is ready for use, and a lubricative layer may be applied thereon to avoid the abrasion to the magnetic head.

The present invention can be more fully understood by reference to the following description and accompanying drawings, which form an integral part of this application.

DETAILED DESCRIPTION OF THE PREFERRED EMBODIMENTS

Figure 1:
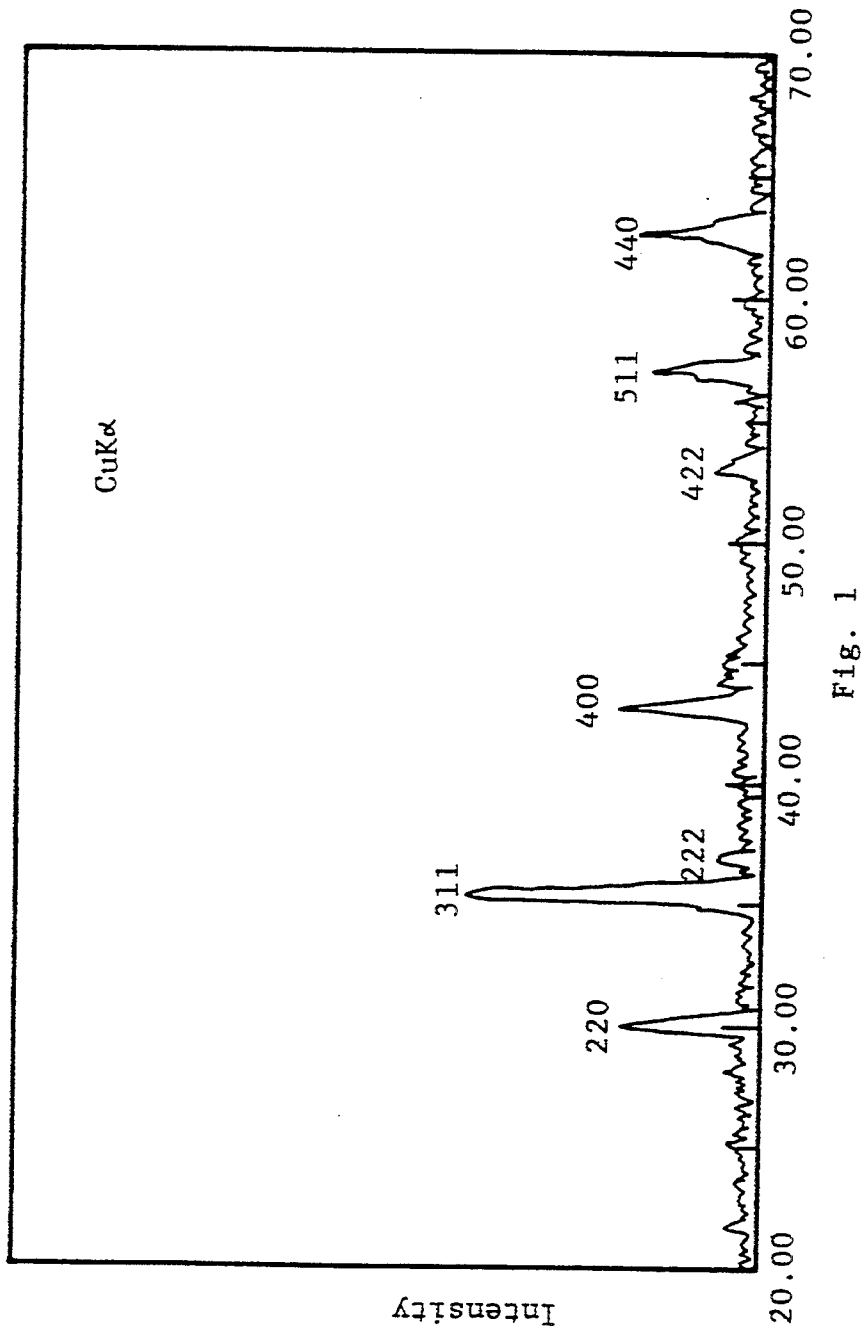
FIG. 1 shows an X-ray diffraction pattern of an $Fe_3O_4$ thin film of the present invention.

The present invention discloses a method for preparing a magnetic recording medium thin film which allows a mass production, and uses appropriate cobalt and manganese additives to control the coercivity, so that it is suitable to be applied to the magnetic thin film having a high recording density. The method of the present invention includes the following steps of: providing a substrate; providing a solution containing cobalt, manganese, and iron; and causing the solution to form a magnetic recording medium thin film on the substrate under predetermined control conditions which will be described in detail hereinafter.

The substrate must have a high-temperature stability, and may be of, for example, an alumina, alumino-magnesium alloy, stainless steel, glass, or the like. In preparing the solution, a deionized water having a resistance of 18 Mohm-cm and a concentration of about 0.1M to 1M is used as a solvent. There are two reasons for using the high-resistance deionized water: 1. Nitrates of iron, cobalt, and manganese are all water soluble. 2. The composition per se has a great effect to the magnetic properties of the thin film, and only use of the deionized water can precisely control the composition of cations. The basic material of the present invention is a ferric nitrate having a purity of at least 99.5%. Since the pure ferrite magnetic thin film has an obviously insufficient coercivity (lower than 200 Oe), it is not suitable to serve as the thin film material for magnetic recording. In the present invention, cobaltous nitrate and manganese nitrate both having a purity of at least 99.5% are added to enhance the coercivity up to 600–1700 Oe which is suitable for the thin film of magnetic recording medium. The magnetic recording medium thin film of the present invention is formed by a spray pyrolysis method. The prepared solution is aerosolized and sprayed onto the preheated polycrystalline alumina substrate at 300° C. by a pressure-feed spray-gun. The aerosol droplets are decomposed and deposited at a high temperature. Since it is decomposed from a liquid phase, and the temperature is not too high, the composition of the thin film is uniformly distributed on the substrate. The composition of the thin film represented by wt% of cations includes 2–18% cobalt, 0–18% manganese, and 64–98% iron, and preferably 6–15% cobalt and 6–15% manganese. The formed magnetic recording medium thin film must have a $\gamma$-$Fe_2O_3$ and/or $Fe_3O_4$ phases. The thin film has a thickness of 1000–5000 nm, a coercivity of 600–1700 Oe, a saturation magnetization of 380–480 emu/cm$^3$, and a squareness ratio of 0.46–0.66. In the above-mentioned preferable case, the coercivity is higher than 1000 Oe, the saturation magnetization is higher than 420 emu/cm$^3$, and the squareness ratio is higher than 0.6. In order to obtain stability and above properties, the formed thin film has to be loaded into a furnace, and undergoes a first heat treatment step of being isothermally oxidized to form the $\alpha$-$Fe_2O_3$ phase in air at 400°–600° C. for 1–4 hours, and a second heat treatment step of being isothermally reduced to form the $Fe_3O_4$ phase from the $\alpha$-$Fe_2O_3$ phase in ($H_2+N_2+H_2O$) atmosphere at 300°–350° C. for 0.5–3 hours, preferably at 320°–330° C. for 1 hour. The obtained thin film may undergo a third heat treatment step of being raised to a temperature of 400°–500° C. for 0.5–2 hours in an $N_2$(nitrogen) protection, isothermally, for stress relieving. The thin film may then undergo a fourth heat treatment step of being lowered to a temperature of 300°–380° C. for isothermal oxidation in air for 0.1–4 hours, preferably to 360°–380° C. for 0.5–2 hours, to obtain the $\gamma$-$Fe_2O_3$ phase to be then cooled. In order to obtain better results, the magnetic recording medium thin film may further undergo a fifth heat treatment step of being raised to a temperature of 300°–380° C. and then annealed for 0.1–10 hours in the furnace, preferably to 340°–380 °C. and then annealed for 2–8 hours in the furnace, to be cooled. The thin film may finally undergo a sixth heat treatment step of being isothermally reduced to form the $Fe_3O_4$ phase from the $\gamma$-$Fe_2O_3$ phase in ($H_2+N_2+H_2O$) atmosphere at 300°–350° C. for 0.5–3 hours, preferably at 320°–330° C. for 1 hour, and being moved out of the furnace after the furnace becomes cool. The magnetic recording medium thin film resulted after subject to the six heat treatment is ready for use, and a lubricative layer may be applied thereon to avoid the abrasion to the magnetic head.

Figure 4:
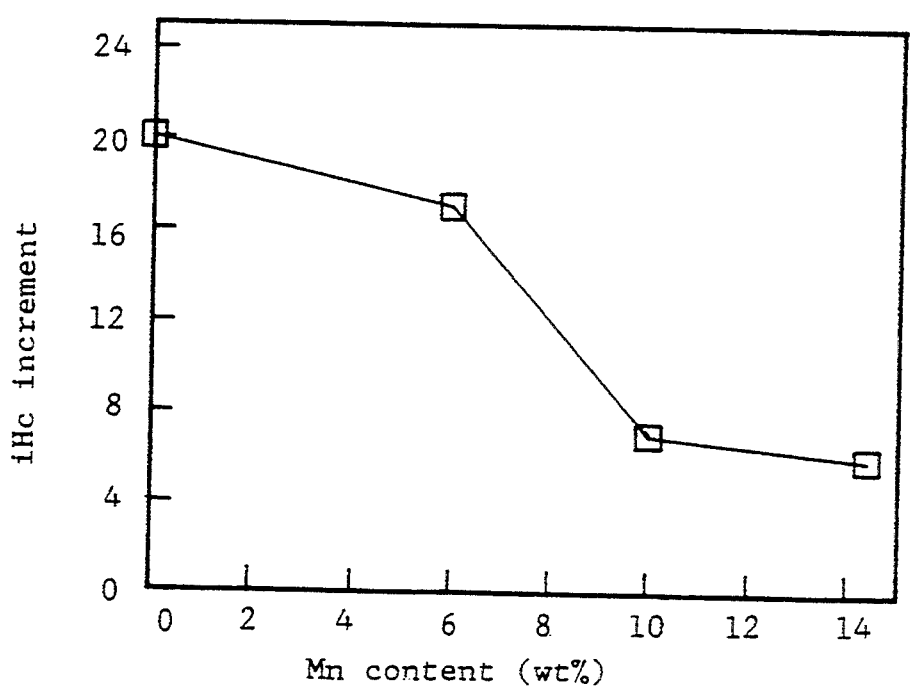
FIG. 4 shows a diagram of the variation of the coercivity increment versus the manganese content of the thin film of FIG. 3 after subject to an annealing heat treatment step at 360° C. for eight hours.

The resulting thin film is examined by an X-ray diffraction analysis for phase identification, and it is verified that the thin film includes only the $\gamma$-$Fe_2O_3$ and $Fe_3O_4$ phases. The grain size is between 5–15 μm, and the coercivity can be controlled by the contents of additives, for example by changing the percentages of cobalt and manganese, and by the heat treatment conditions. From the experiments which will be discussed below, it is noted that the coercivity increases with the increase of the manganese content. The resulted thin film is further subject to a heat treatment, and from what is shown in FIG. 4, it is noted that the annealing heat treatment can further enhance the coercivity thereof.

In sum, the preparing method of the present invention is simple, and is easy to control the contents of the alloy and the heat treatment conditions so as to obtain the desired film coercivity. The method is suitable to prepare the magnetic thin film for high density recording. Also, the formed thin film may be further machined into particulates for magnetic tapes.

Several experimental examples will be described hereinafter for best understanding of the magnetic recording medium thin film of the present invention. However, it should be understood that they do not be intended to limit the protection scope of the present invention.

EXAMPLE 1

$Fe(NO_3)_3 9H_2O(S)$ of 19.098 g, and $Co(NO_3)_2 \cdot 6H_2O(S)$ of 1.778 g are dissolved in a 100 ml deionized water to form an aqueous solution of orange colour. The weight percentage (wt%) ratio of cations is Fe:Co=88:12. The solution is aerosolized and sprayed onto a substrate to form a black as-sprayed thin film. The as-sprayed thin film is loaded into a furnace for the following heat treatments: (1) Raising the furnace temperature to 600° C. for film isothermal oxidation to form the $\alpha$-$Fe_2O_3$ phase in air for 2 hours; (2) isothermally reducing the thin film at 320° C. at an ($H_2+N_2+H_2O$) atmosphere for 1 hour to form the $Fe_3O_4$ phase from the $\alpha$-$Fe_2O_3$ phase; (3) Raising the furnace temperature to 450° C. for 1 hour in $N_2$ protection, for stress relieving; (4) Lowering the furnace temperature to 380° C. for film isothermal oxidation in air for 2 hours to obtain the $\gamma$-$Fe_2O_3$ phase; and (5) Moving out the thin film of deep black colour after the furnace becomes cool. From the X-ray diffraction analysis, this thin film is found to be a pure $\gamma$-$Fe_2O_3$ phase thin film. Its coercivity is 1000 Oe, saturation magnetization is 400 emu/cm$^3$, and squareness ratio is 0.63.

The thin film may further undergo the following heat treatment: (6) Raising the furnace temperature to 360° C. for annealing the thin film in the furnace for 2 hours; and (7) Causing the thin film to be moved out of the furnace after the furnace becomes cool. This annealing process can enhance the coercivity up to 1200 Oe. The saturation magnetization, however, remains unchanged, and the squareness ratio becomes 0.61. Then, the thin film is subject to the following heat treatments: (8) being isothermally reducing at 320° C. at an ($H_2+N_2+H_2O$) atmosphere for 1 hour to form the $Fe_3O_4$ phase from the $\gamma$-$Fe_2O_3$ phase; and (9) being moved out at a pure $Fe_3O_4$ phase after the furnace becomes cool. Referring to FIG. 1, there is shown an X-ray diffraction pattern of this thin film. After analyzed, it can be verified that the thin film is of a pure $Fe_3O_4$ phase. Its coercivity is 1680 Oe, saturation magnetization is 480 emu/cm$^3$, and squareness ratio is 0.51.

EXAMPLE 2

The $Fe(NO_3)_3 \cdot 9H_2O(S)$ of 17.796 g, $Co(NO_3)_2 \cdot 6H_2O(S)$ of 1.778 g, and $Mn(NO_3)_2 \cdot 4H_2O(S)$ of 0.819 g are dissolved in a 100 ml deionized water to form an aqueous solution of orange colour. The weight percentage (wt%) ratio of cations is Fe:Co:Mn=82:12:6. The solution is aerosolized and sprayed onto a substrate to form a black as-sprayed thin film. The as-sprayed thin film is loaded into a furnace for the same heat treatment steps (1) to (5) as described above. From an X-ray diffraction analysis, the resulted thin film of deep black colour is of a pure $\gamma$-$Fe_2O_3$ phase. Its coercivity is 1100 Oe, saturation magnetization is 400 emu/cm$^3$, and squareness ratio is 0.63.

The thin film may further undergo the following heat treatments: (6) Raising the furnace temperature to 360° C. for annealing the thin film in the furnace for 2 hours; and (7) Causing the thin film to be moved out of the furnace after the furnace becomes cool. This annealing process can enhance the film coercivity up to 1300 Oe. However, its saturation magnetization remains unchanged, and its squareness ratio is 0.63. Then, the thin film is subject to the following heat treatment: (8) Being isothermally reduced at 320° C. at an $(H_2+N_2+H_2O)$ atmosphere for 1 hour to form the $Fe_3O_4$ phase from the $\gamma$-$Fe_2O_3$ phase; and (9) Being moved out of the furnace at a pure $Fe_3O_4$ phase after the furnace becomes cool. Its coercivity is 1260 Oe, saturation magnetization is 480 emu/cm$^3$, and squareness ratio is 0.50.

EXAMPLE 3

The $Fe(NO_3)_3 \cdot 9H_2O(S)$ of 16.928 g, $Co(NO_3)_2 \cdot 6H_2O(S)$ of 1.778 g, and $Mn(NO_3)_2 \cdot 4H_2O(S)$ of 1.371 g are dissolved in a 100 ml deionized water to form an aqueous solution of orange colour. The weight percentage (wt%) ratio of cations is Fe:Co:Mn =78:12:10. The solution is aerosolized and sprayed onto a substrate to form a black as-sprayed thin film. The as-sprayed thin film is loaded into a furnace for the same heat treatment steps (1) to (5) as described above. From an X-ray diffraction analysis, the resultant thin film of deep black colour is of a pure $\gamma$-$Fe_2O_3$ phase. Its coercivity is 1120 Oe, saturation magnetization is 400 emu/cm$^3$, and squareness ratio is 0.66.

The thin film may further undergo the following heat treatment: (6) Raising the furnace temperature to 360° C. for annealing the thin film in the furnace for 2 hours; and (7) Causing the thin film to be moved out of the furnace after the furnace becomes cool. This annealing process can enhance the coercivity up to 1200 Oe. The saturation magnetization, however, remains unchanged, and the squareness ratio is 0.65. Then, the thin film is subject to the following heat treatment: (8) Being isothermally reduced at 320° C. at an $(H_2+N_2+H_2O)$ atmosphere for 1 hour to form the $Fe_3O_4$ phase from the $\gamma$-$Fe_2O_3$ phase; and (9) Being moving out of the furnace at a pure $Fe_3O_4$ phase after the furnace becomes cool. Its coercivity is 660 Oe, saturation magnetization is 480 emu/cm$^3$, and squareness ratio is 0.48.

EXAMPLE 4

Figure 2:
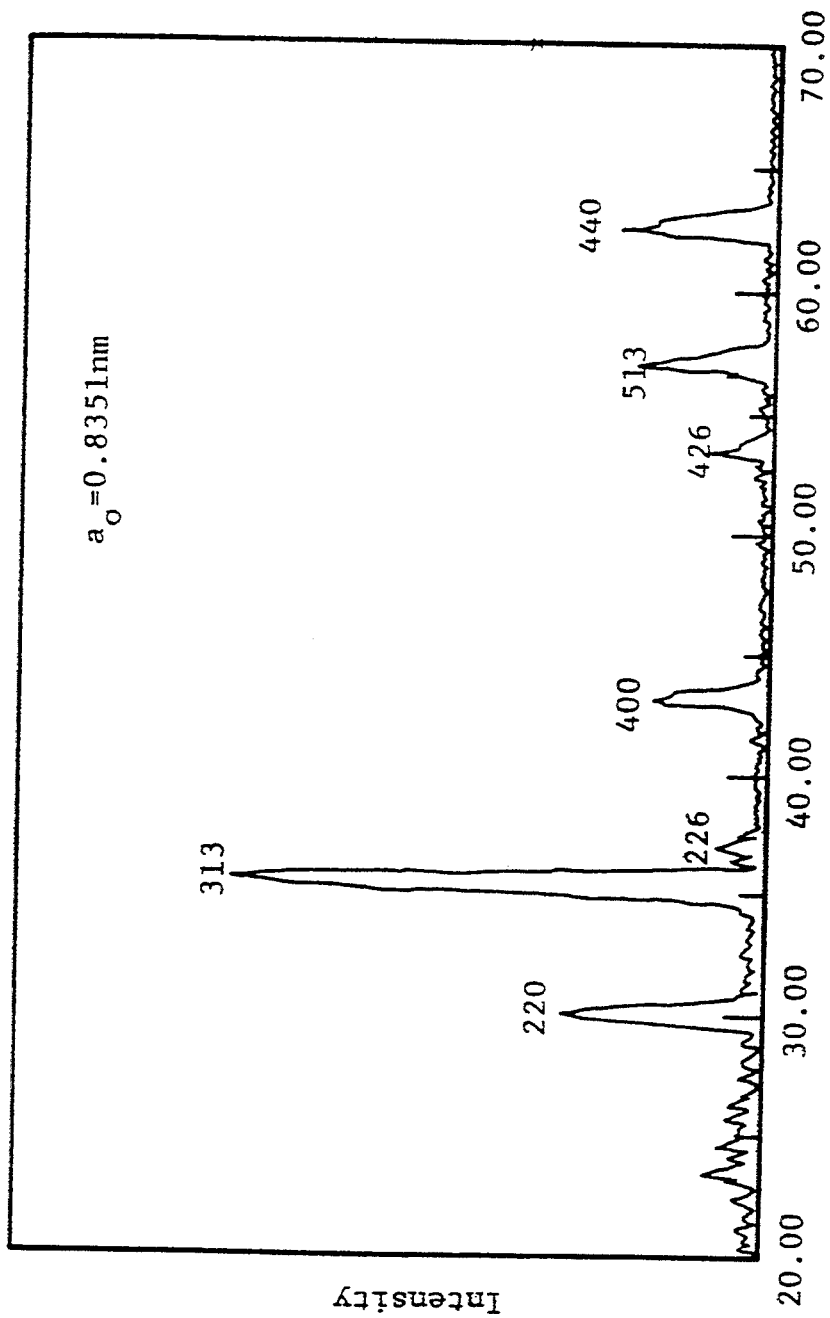
FIG. 2 shows an X-ray diffraction pattern of a$\gamma$-$Fe_2O_3$ thin film of the present invention.

The $Fe(NO_3)_3 9H_2O(S)$ of 15.972 g, $Co(NO_3)_2 \cdot 6H_2O(S)$ of 1.778 g, and $Mn(NO_3)_2 \cdot 4H_2O(S)$ of 1.974 g are dissolved in a 100 ml deionized water to form an aqueous solution of orange colour. The weight percentage (wt%) ratio of cations is Fe:Co:Mn =73.6:12:14.4. The solution is aerosolized and sprayed onto a substrate to form a black as-sprayed thin film. The as-sprayed thin film is loaded into a furnace for the same heat treatment steps (1) to (5) as described above. Referring to FIG. 2, there is shown an X-ray diffraction pattern of the resultant thin film of deep black colour. It can be noted that the thin film is of a pure $\gamma$-$Fe_2O_3$ phase. Its coercivity is 1220 Oe, saturation magnetization is 400 emu/cm$^3$, and squareness ratio is 0.61.

The thin film may further undergo the following heat treatment: (6) Raising the furnace temperature to 360° C. for annealing the thin film in the furnace for 2 hours; and (7) Causing the thin film to be moved out of the furnace after the furnace becomes cool. This annealing process can enhance the coercivity up to 1300 Oe. The saturation magnetization, remains unchanged, and the squareness ratio is 0.61. Then, the thin film is subject to the following heat treatment: (8) Being isothermally reduced at 320° C. at an $(H_2+N_2O)$ atmosphere for 1 hour to form the $Fe_3O_4$ phase from the $\gamma$-$Fe_2O_3$ phase; and (9) Being moved out of the furnace at a pure $Fe_3O_4$ phase after the furnace becomes cool. Its coercivity is 720 Oe, saturation magnetization is 480 emu/cm$^3$, and squareness ratio is 0.50.

EXAMPLE 5

The $Fe(NO_3)_3 \cdot 9H_2O(S)$ of 16.624 g, $Co(NO_3)_2 \cdot 6H_2O(S)$ of 1.333 g, and $Mn(NO_3)_2 \cdot 4H_2O(S)$ of 1.974 g are dissolved in a 100 ml deionized water to form an aqueous solution of orange colour. The weight percentage (wt%) ratio of cations is Fe:Co:Mn=76.9:9:14.4. The solution is aerosolized and sprayed onto a substrate to form a black as-sprayed thin film. The as-sprayed thin film is loaded into a furnace for the same heat treatment steps (1) to (5) as described above. From the X-ray diffraction analysis, the resultant thin film of deep black colour is of a pure $\gamma$-$Fe_2O_3$ phase. Its coercivity is 900 Oe, saturation magnetization is 400 emu/cm$^3$, and squareness ratio is 0.61.

The thin film may further undergo the following heat treatment: (6) Raising the furnace temperature to 360° C. for annealing the thin film in the furnace for 2 hours; and (7) Causing the thin film to be moved out of the furnace after the furnace becomes cool. This annealing process can enhance the coercivity up to 1100 Oe. The saturation magnetization, however, remains unchanged, and the squareness ratio is 0.61. Then, the thin film is subject to the following heat treatment: (8) Being isothermally reduced at 320° C. at an $(H_2+N_2+H_2O)$ atmosphere for 1 hour to form the $Fe_3O_4$ phase from the $\gamma$-$Fe_2O_3$ phase; and (9) Being moving out of the furnace at a pure $Fe_3O_4$ phase after the furnace becomes cool. Its coercivity is 720 Oe, saturation magnetization is 480 emu/cm$^3$, and squareness ratio is 0.47.

EXAMPLE 6

The $Fe(NO_3)_3 \cdot 9H_2O(S)$ of 15.332 g, $Co(NO_3)_2 \cdot 6H_2O(S)$ of 2.222 g, and $Mn(NO_3)_2 \cdot 4H_2O(S)$ of 1.974 g are dissolved in a 100 ml deionized water to form an aqueous solution of orange colour. The weight percentage (wt%) ratio of cations is Fe:Co:Mn=70.6:15:14.4. The solution is aerosolized and sprayed onto a substrate to form a black as-sprayed thin film. The as-sprayed thin film is loaded into a furnace for the same heat treatment steps (1) to (5) as described above. From the X-ray diffraction analysis, the resultant thin film of deep black colour is of a pure $\gamma$-$Fe_2O_3$ phase. Its coercivity is 1120 Oe, saturation magnetization is emu/cm$^3$, and squareness ratio is 0.61.

The thin film may further undergo the following heat treatment: (6) Raising the furnace temperature to 360° C. for annealing the thin film in the furnace for 2 hours; and (7) Causing the thin film to be moved out of the furnace after the furnace becomes cool. This annealing process can enhance the coercivity up to 1300 Oe. The saturation magnetization, however, remains unchanged, and the squareness ratio is 0.61. Then, the thin film is subject to the following heat treatment: (8) Being isothermally reduced at 320° C. at an ($H_2+N_2+H_2O$) atmosphere for 1 hour to form the $Fe_3O_4$ phase from the $\gamma$-$Fe_2O_3$ phase; and (9) Being moved out of the furnace at a pure $Fe_3O_4$ phase after the furnace becomes cool. Its coercivity is 780 Oe, saturation magnetization is 480 emu/cm$^3$, and squareness ratio is 0.46.

Figure 3:
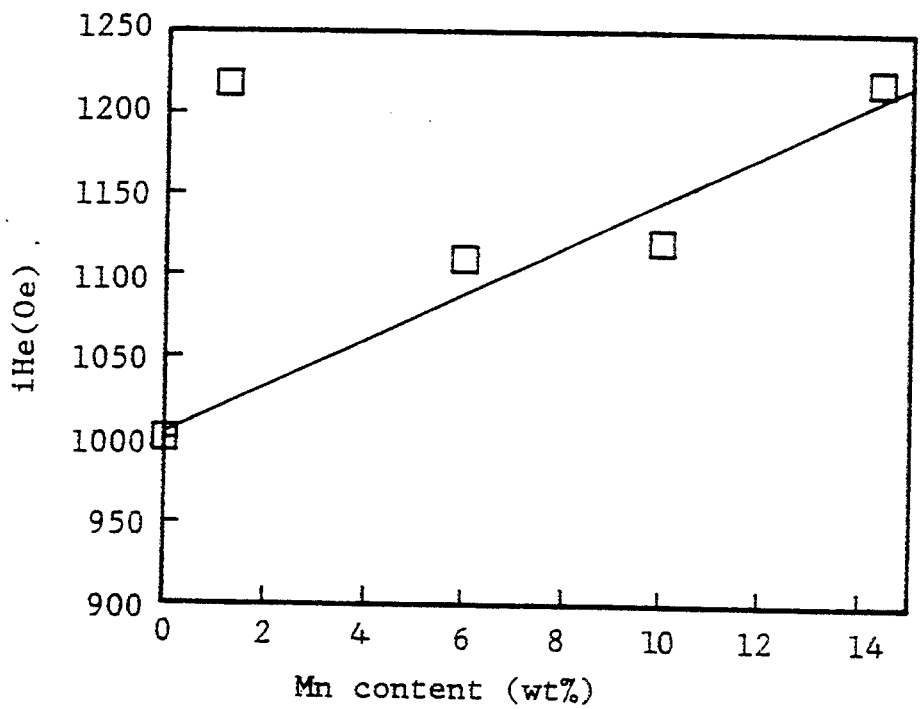
FIG. 3 shows a diagram of the variation of the coercivity versus the manganese content of the $\gamma$-$Fe_2O_3$ phase thin film with 12 wt% cobalt, after four steps of heat treatments.

Analyzing the above experimental results, it can be known how the manganese contents and annealing heat treatments affect the coercivity of the thin film, as shown in FIGS. 3 and 4. FIG. 3 shows the variation of the intrinsic coercivity (iHc) versus Mn content (wt%) of the $\gamma$-$Fe_2O_3$ phase thin film with 12 wt% cobalt after the thin film is subject to the heat treatment steps (1) to (5) as described above. The coercivity increases with the increase of the manganese content. FIG. 4 shows the variation of the intrinsic coercivity (iHc) increment versus Mn content (wt%) of the same thin film as in FIG. 3 after the thin film is annealed at 360° C. for 8 hours. It is noted that the annealing heat treatment is helpful for the increasing of the film coercivity.

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What we claim is:

1. A method for preparing a magnetic recording medium comprising steps of:
   (a) providing a substrate;
   (b) providing a solution consisting essentially of ions of cobalt, manganese, and iron in deionized water; and
   (c) preheating the substrate and spraying said solution onto the preheated substrate at an elevated temperature to uniformly distribute droplets thereon and form a magnetic recording medium film on said substrate.
2. A preparing method as claimed in claim 1, wherein said substrate is an alumina substrate having a relatively high-temperature stability.
3. A preparing method as claimed in claim 1, wherein said substrate is an alumino-magnesium alloy substrate having a relatively high-temperature stability.
4. A preparing method as claimed in claim 1, wherein said substrate is a stainless steel substrate having a relatively high-temperature stability.
5. A preparing method as claimed in claim 1, wherein said substrate is a glass substrate having a relatively high-temperature stability.
6. A preparing method as claimed in claim 1, wherein said magnetic recording medium thin film is formed by a spray pyrolysis method.
7. A preparing method as claimed in claim 1, wherein said solution contains a cobaltous nitrate, a manganese nitrate, and a ferric nitrate all having a purity of about 99.5%.
8. A preparing method as claimed in claim 1, wherein a composition of said magnetic recording medium thin film, represented by a weight percentage of cations, includes cobalt of about 2–18%, manganese of about 0–18%, and iron of about 64–98%.
9. A preparing method as claimed in claim 8, wherein said composition of said magnetic recording medium thin film preferably includes cobalt of about 6–15%, and manganese of about 6–15%.
10. A preparing method as claimed in claim 1, wherein said magnetic recording medium thin film has a $\gamma$-$Fe_2O_3$ phase.
11. A preparing method as claimed in claim 1, wherein said magnetic recording medium thin film has a $Fe_3O_4$ phase.
12. A preparing method as claimed in claim 1, wherein said magnetic recording medium thin film has a $\gamma$-$Fe_2O_3$ and a $Fe_3O_4$ phases.
13. A preparing method as claimed in claim 1, wherein said magnetic recording medium thin film has a thickness of about 1000–5000 nm, a coercivity of about 600–1700 Oe, a saturation magnetization of about 380–480 emu/cm$^3$, and a squareness ratio of about 0.46–0.66.
14. A preparing method as claimed in claim 13, wherein said magnetic recording medium thin film has a coercivity of at least about 1000 Oe, a saturation magnetization of at least about 420 emu/cm$^3$, and a squareness ratio of at least about 0.6.
15. A preparing method as claimed in claim 1, further comprising isothermally oxidizing said film to form an $\gamma$-$Fe_2O_3$ phase.
16. A preparing method as claimed in claim 15, further comprising isothermally reducing said film to form an $Fe_3O_4$ phase.
17. A preparing method as claimed in claim 16, wherein said isothermal reduction is at about 320°–330° C. in an ($H_2+N_2+H_2O$) atmosphere for about one hour.
18. A preparing method as claimed in claim 16, further comprising raising a temperature for said thin film to about 400°–500° C. for stress relieving under nitrogen protection for about 0.5–2 hours, isothermally.
19. A preparing method as claimed in claim 18, further comprising thereafter lowering the temperature of said thin film in air for about 0.1–4 hours to obtain a $\gamma$-$Fe_2O_3$ phase.
20. A preparing method as claimed in claim 19, wherein said temperature is reduced to about 360°–380° C. in air for about 0.5–2 hours.
21. A preparing method as claimed in claim 19, wherein said magnetic recording medium thin film is subsequently cooled.
22. A preparing method as claimed in claim 19, further comprising raising the temperature of said thin film to about 300°–380° C. in a furnace to anneal said thin film for about 0.1–10 hours.
23. A preparing method as claimed in claim 22, wherein said film is heated to about 340°–380° C. for about 2–8 hours.
24. A preparing method as claimed in claim 22, further comprising isothermally reducing said film to form a $Fe_3O_4$ phase from said $\gamma$-$Fe_2O_3$ phase at about 300°–350° C. in an ($H_2+N_2+H_2O$) atmosphere for 0.5–3 hours.

25. A preparing method as claimed in claim 24, wherein said thin film is isothermally reduced at about 320°-330° C. for about one hour.

26. A preparing method as claimed in claim 24, wherein said thin film is cooled prior to said isothermal reduction.

27. A preparing method as claimed in Claim 24, wherein said magnetic recording medium thin film is moved out of said furnace after said furnace becomes cooled.

28. A preparing method as claimed in claim 1, further comprising a step of providing a lubricative layer on said magnetic recording medium thin film.

* * * * *